US009418609B2

(12) United States Patent
Choi

(10) Patent No.: US 9,418,609 B2
(45) Date of Patent: *Aug. 16, 2016

(54) DISPLAY APPARATUS HAVING DISPLAY DRIVING UNIT ON LOWER PART

(71) Applicant: SAMSUNG ELECTRONICS CO., LTD., Suwon-si (KR)

(72) Inventor: Jung-hwa Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,149

(22) Filed: Sep. 16, 2014

(65) Prior Publication Data

US 2015/0002493 A1    Jan. 1, 2015

Related U.S. Application Data

(63) Continuation of application No. 14/099,471, filed on Dec. 6, 2013, now Pat. No. 9,030,612, which is a continuation of application No. 13/614,547, filed on Sep. 13, 2012, now Pat. No. 8,619,201, which is a continuation of application No. 12/758,115, filed on Apr. 12, 2010, now Pat. No. 8,760,588.

(30) Foreign Application Priority Data

May 8, 2009    (KR) .................. 10-2009-0040039
Oct. 23, 2009  (KR) .................. 10-2009-0101186

(51) Int. Cl.
*G09G 3/36*    (2006.01)
*G06F 1/16*    (2006.01)
(Continued)

(52) U.S. Cl.
CPC ............ *G09G 3/3611* (2013.01); *G06F 1/1601* (2013.01); *H04N 5/64* (2013.01); *H04N 19/40* (2014.11); *G09G 2310/0264* (2013.01)

(58) Field of Classification Search
CPC .............. G06F 1/601; G06F 1/20; H04N 5/64
USPC ........................................ 348/790, 794, 836
See application file for complete search history.

(56) References Cited

U.S. PATENT DOCUMENTS

| 5,146,354 A | 9/1992 | Plesinger |
| 5,739,887 A | 4/1998 | Ueda et al. |

(Continued)

FOREIGN PATENT DOCUMENTS

| JP | 2006-139244 A | 6/2006 |
| JP | 2008-116564 A | 5/2008 |

(Continued)

OTHER PUBLICATIONS

Extended European Search Report issued Sep. 13, 2010 in counterpart European Application No. 10158594.1.

(Continued)

*Primary Examiner* — Brian Yenke
(74) *Attorney, Agent, or Firm* — Sughrue Mion, PLLC

(57) ABSTRACT

A display apparatus having a display driving unit on a lower part is provided. The LCD display apparatus includes a signal processing unit which performs video decoding, video scaling, and conversion into high-quality video on an input video; and a driving unit which is disposed closer to a lower end of the LCD display apparatus than to an upper end of the LCD display apparatus, and drives a liquid crystal display (LCD) panel to display a video output from the signal processing unit on the LCD panel.

11 Claims, 13 Drawing Sheets

(51) Int. Cl.
*H04N 5/64* (2006.01)
*H04N 19/40* (2014.01)

(56) References Cited

U.S. PATENT DOCUMENTS

| | | | |
|---|---|---|---|
| 6,256,075 B1 * | 7/2001 | Yang | 348/843 |
| 6,515,679 B1 | 2/2003 | Igarashi et al. | |
| 6,734,926 B2 | 5/2004 | Fan et al. | |
| 6,894,757 B2 | 5/2005 | Ha et al. | |
| 7,206,025 B2 | 4/2007 | Choi | |
| 7,420,618 B2 | 9/2008 | Swartz | |
| 7,525,602 B2 | 4/2009 | Yamamoto | |
| 7,602,440 B2 * | 10/2009 | Nishi et al. | 348/441 |
| 7,839,396 B2 | 11/2010 | Yang et al. | |
| 7,952,563 B2 * | 5/2011 | Park et al. | 345/173 |
| 2002/0044217 A1 | 4/2002 | Burchard et al. | |
| 2002/0171774 A1 * | 11/2002 | Lee | 348/731 |
| 2003/0011736 A1 | 1/2003 | Ha et al. | |
| 2004/0052038 A1 | 3/2004 | Wu | |
| 2004/0141718 A1 | 7/2004 | Miyagoshi et al. | |
| 2004/0189880 A1 * | 9/2004 | Lee et al. | 348/820 |
| 2006/0077620 A1 | 4/2006 | Kim | |
| 2006/0104067 A1 | 5/2006 | Hwang et al. | |
| 2006/0109230 A1 | 5/2006 | An et al. | |
| 2006/0125996 A1 | 6/2006 | Lim | |
| 2006/0214881 A1 | 9/2006 | Kim et al. | |
| 2006/0256257 A1 | 11/2006 | Nakano et al. | |
| 2007/0046840 A1 | 3/2007 | Yokawa | |
| 2007/0091223 A1 | 4/2007 | Maruta et al. | |
| 2007/0159447 A1 | 7/2007 | Choi | |
| 2007/0258199 A1 | 11/2007 | Jeong | |
| 2007/0285349 A1 | 12/2007 | Hong et al. | |
| 2007/0285380 A1 | 12/2007 | Jun | |
| 2008/0018626 A1 | 1/2008 | Yang et al. | |
| 2008/0068330 A1 | 3/2008 | Urisu | |
| 2008/0068517 A1 | 3/2008 | Urisu | |
| 2008/0088243 A1 | 4/2008 | Kim et al. | |
| 2008/0088635 A1 | 4/2008 | Callway et al. | |
| 2008/0122826 A1 | 5/2008 | Tung et al. | |
| 2008/0129666 A1 | 6/2008 | Shimotono et al. | |
| 2008/0165482 A1 | 7/2008 | Kim | |
| 2008/0273003 A1 | 11/2008 | Jeon | |
| 2008/0284707 A1 | 11/2008 | Katagawa et al. | |
| 2008/0291326 A1 | 11/2008 | Shishido et al. | |
| 2009/0115919 A1 | 5/2009 | Tanaka et al. | |
| 2009/0135577 A1 * | 5/2009 | Jeong | 361/816 |
| 2009/0147175 A1 | 6/2009 | Tsumura et al. | |
| 2009/0201279 A1 | 8/2009 | Ogata et al. | |
| 2009/0225239 A1 | 9/2009 | Osada et al. | |
| 2009/0262263 A1 | 10/2009 | Miller | |
| 2010/0007789 A1 | 1/2010 | Mori et al. | |
| 2010/0059648 A1 | 3/2010 | Zhang et al. | |
| 2010/0156775 A1 | 6/2010 | Yu | |
| 2010/0271568 A1 | 10/2010 | Jung et al. | |

FOREIGN PATENT DOCUMENTS

| | | |
|---|---|---|
| JP | 4479710 B2 | 6/2010 |
| KR | 10-2006-0029342 A | 4/2006 |
| KR | 10-2008-0008620 A | 1/2008 |
| KR | 10-2008-0008751 A | 1/2008 |
| WO | 2008/010288 A1 | 1/2008 |

OTHER PUBLICATIONS

Communication, dated Jul. 19, 2013, issued by the European Patent Office, in counterpart application No. 13167323.8.
Communication dated Mar. 13, 2014 issued by the European Patent Office in counterpart European Application No. 13192686.7.
Communication, Issued by the Taiwan Intellectual Property Office, Dated Dec. 16, 2014, in counterpart Taiwanese Application No. 099114477.
Communication, Issued by the European Patent Office, Dated Feb. 3, 2015, in counterpart European Application No. 13 192 686.7.
Communication, dated May 8, 2015, issued by the European Patent Office, in counterpart application No. 13192686.7.
Communication, dated Jun. 17, 2015, issued by the European Patent Office, in counterpart application No. 15156266.7.
Communication issued on Nov. 25, 2015 by the European Patent Office in related Application No. 13192686.7.
Communication dated Apr. 13, 2016, issued by the Taiwanese Patent Office in counterpart Taiwanese Application No. 104114536.
Communication dated Jun. 17, 2016, issued by the European Patent Office in counterpart European Application No. 13192686.7.

* cited by examiner

DISPLAY APPARATUS HAVING DISPLAY DRIVING UNIT ON LOWER PART

CROSS-REFERENCE TO RELATED APPLICATIONS

This application is a Continuation application of U.S. patent application Ser. No. 14/099,471, filed Dec. 6, 2013, which is Continuation application of U.S. patent application Ser. No. 13/614,547, filed Sep. 13, 2012 and issued as U.S. Pat. No. 8,619,201, which is a Continuation application of U.S. patent application Ser. No. 12/758,115, filed Apr. 12, 2010 and issued as U.S. Pat. No. 8,760,588, which claims benefit from Korean Patent Application No. 10-2009-0040039, filed on May 8, 2009, and No. 10-2009-0101186, filed Oct. 23, 2009, in the Korean Intellectual Property Office, the disclosures of which are incorporated herein by reference in their entireties.

BACKGROUND OF THE INVENTION

1. Field of the Invention

Apparatuses consistent with the present invention relate to a display apparatus, and more particularly, to a display apparatus which processes a signal of a video input through an antenna, a cable, an external device, and so on, and displays the processed video.

2. Description of the Related Art

FIG. 1 is a view illustrating an arrangement of units of a related art digital television (DTV). Referring to FIG. 1, a display driving unit 30 for driving a display 10 is fixed on an upper part of the display 10. A video processing board 50 having a video processing unit 60 for performing video decoding and video scaling and an input and output terminal 70 is installed on a lower part of the display 10.

A frame rate converter (FRC) 90 for converting a frame rate of a video processed by the video processing unit 60 is located below the display driving unit 30.

As illustrated in FIG. 1, if the display driving unit 30 is positioned on an upper part of the DTV, the display driving unit 30 is exposed to heat which is generated from the lower side surface of the DTV and is radiated toward the upper center part, and the heat may cause a problem on the DTV. This is illustrated in FIG. 2.

Cables 81, 82, 90 for connecting units are provided in the DTV. Recently, as a video having high-quality and high-resolution has been preferred, expensive cables supporting a high bandwidth are needed to process such video. Accordingly, it is required to minimize the length of a cable when the DTV is embodied, in order to reduce the fabrication cost of the DTV.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

Exemplary embodiments of the present invention provide a display apparatus having a display driving unit on a lower part in order to prevent the display driving unit from being exposed to heat.

According to an exemplary aspect of the present invention, there is provided a display apparatus, including: a display; a driving unit which is located on a part nearer a lower end of the display apparatus than an upper end of the display apparatus, and drives the display; and a processing unit which is located on a part nearer a lower end of the displays apparatus than an upper end of the display apparatus, and processes of a video signal to be provided to the driving unit.

The driving unit may be located on a part nearer an upper end of the display than a lower end of the display, but the driving unit may be located on a part nearer a lower end of the display apparatus than an upper end of the display apparatus since the display is disposed toward a bottom surface.

The driving unit may drive the display so that a video provided from the processing unit is displayed on the display while being rotated 180°.

The processing unit may perform at least one of video decoding, video scaling, and signal processing to convert a video into a high-quality or high-resolution video.

The signal processing to convert a video into a high-quality or high-resolution video may include a frame rate conversion (FRC).

A distance between the driving unit located on a part nearer a lower end of the display apparatus than an upper end of the display apparatus and the processing unit is shorter than a distance between the driving unit and the processing unit when the driving unit is located on a part nearer an upper end of the display apparatus than a lower end of the display apparatus.

The processing unit may be located between an external connection terminal and the display driving unit.

A cable which transfers a video from the processing unit to the driving unit may include a first layer and a second layer to transfer a video.

If the processing unit converts the video into a high-quality or high-resolution video, the video may be transferred through the first layer and the second layer, and if the processing unit does not convert the video into a high-quality or high-resolution video, the video may be transferred through either the first layer or the second layer.

The operation of converting the video into a high-quality or high-resolution video by the processing unit may include an operation of increasing a frame rate of the video by the processing unit.

An aspect of the invention is a display apparatus including a display; a driving unit which is disposed closer to a lower end of the display apparatus than to an upper end of the display apparatus, and drives the display; and a processing unit which is disposed closer to the lower end of the display apparatus than to the upper end of the display apparatus, and processes a video signal to be provided to the driving unit.

Another aspect of the invention is a display apparatus including a movable display including a upper part and a lower part; a driving unit which drives the display and is fixedly mounted on the upper part of the movable display; and a processing unit which processes a video signal, outputs the processed video signal to the driving unit, and is movably mounted on the movable display to one of the upper part and the lower part of the movable display.

Yet another aspect of the invention is a display method of a display apparatus, the method including: rotating a screen of the display apparatus, to change an orientation of a processing unit movably mounted on the screen, from a first orientation to a second orientation with respect to the display apparatus; moving the processing unit with respect to the screen to move the processing unit from the second orientation back to the first orientation with respect to the display apparatus.

Yet another aspect of the invention is a liquid crystal display (LCD) apparatus, the LCD apparatus including: a liquid crystal display (LCD) module comprising a liquid crystal display (LCD) panel and a backlight unit; a signal processing unit which is mounted on a rear surface of the LCD module, and performs video decoding, video scaling, and conversion into high-quality video on an input video; and a driving unit which is mounted on a rear surface of the LCD module, is connected to the signal processing unit, is disposed closer to a lower end of the LCD apparatus than to an upper end of the LCD apparatus, and drives the LCD panel to display a video output from the signal processing unit on the LCD panel.

The signal processing unit may convert and output a frame rate of the input video to perform the high-quality video conversion.

The signal processing unit may be implemented using a single chip.

The high-quality video conversion in the signal processing unit may include the case in which the signal processing unit increases a frame rate of the video.

The signal processing unit may convert a frame rate of the input video into 2N times (N=1, 2, 3 . . . ) and outputs it.

The video output from the signal processing unit may be transferred to the driving unit through a cable.

The cable may be a flexible printed circuit board (FPCB) on which a wire capable of transferring the video is printed.

The FPCB may include both ends which are bent.

An end of the FPCB may be bent toward the driving unit, and the other end of the FPCB may be bent toward the signal processing unit.

The FPCB may include a first layer and a second layer which transfer the video.

If the signal processing unit converts the video into a high-quality video, the video may be transferred through the first layer and the second layer, and if the signal processing unit does not convert the video into a high-quality video, the video may be transferred through one of the first layer and the second layer.

The both ends of the FPCB may include an attachable and detachable grip which a user grips to mount or dismount the FPCB to or from an input terminal connected to the driving unit and an output terminal connected to the signal processing unit.

The attachable and detachable grip may be made of a material having density higher than that of the FPCB.

The LCD apparatus may further include a shield bracket which is disposed on a rear surface of a board having the driving unit, blocks electromagnetic waves possibly being emitted from the driving unit, and is coupled to a stand on which the LCD module is placed.

The signal processing unit may convert the video and output the converted video to the driving unit so that the video is displayed on the LCD panel rotated 180°.

The LCD apparatus may further include an input terminal which is mounted on a rear surface of the LCD module adjacent to an edge area in an external direction of the LCD module, and through which the video is input, wherein the signal processing unit and the input terminal may be mounted on a single board.

The driving unit may be mounted on a lower center part of a rear surface of the LCD module.

The driving unit may drive the LCD panel so that the video output from the signal processing unit is displayed on the LCD panel rotated 180°.

An output terminal may be further mounted on a part of the signal processing unit, and an input terminal may be further mounted on a part of the driving unit, wherein the cable may be a flexible printed circuit board (FPCB), on which a wire capable of transferring the video is printed, and which comprises both ends to mount a first connector and a second connector coupled with the output terminal and the input terminal.

The LCD apparatus may further include a power supply unit which is mounted on a rear surface of the LCD module, and supplies power to the LCD panel, the backlight unit, the signal processing unit, and the driving unit.

Yet another aspect of the present invention is a liquid crystal display (LCD) apparatus, the LCD apparatus including: a liquid crystal display (LCD) module which comprises a liquid crystal display (LCD) panel and a backlight unit; an input terminal which is mounted on a rear surface of the LCD module, and receives a video signal having a first frame rate from an external source; a signal processing unit which is mounted on a rear surface of the LCD module, and processes the received video signal and outputs a video signal having a second frame rate; a driving unit which is disposed on a part near a lower end of a rear surface of the LCD module, and drives the LCD panel so that the output video signal is displayed on the LCD panel at the second frame rate.

The input terminal and the signal processing unit may be mounted on a single board, wherein the input terminal may be mounted on a rear surface of the LCD module adjacent to an edge area in an external direction of the LCD module.

The second frame rate may be 2N times (N=1, 2, 3 . . . ) of the first frame rate.

The signal processing unit may convert the video signal and outputs the converted video signal to the driving unit so that the video signal is displayed on the LCD panel rotated 180°.

The driving unit may be mounted on a lower center part of a rear surface of the LCD module.

The driving unit may drive the LCD panel so that the video signal output from the signal processing unit is displayed on the LCD panel rotated 180°.

The video signal output from the signal processing unit may be transferred to the driving unit through a cable.

The LCD apparatus may further include an output terminal which is mounted on a part of the signal processing unit; and an input terminal which is mounted on a part of the driving unit, wherein the cable may be a flexible printed circuit board (FPCB), on which a wire capable of transferring the video signal is printed, and which comprises both ends to mount a first connector and a second connector coupled with the output terminal and the input terminal.

The FPCB may include a first layer and a second layer which transfer the video signal.

An end of the FPCB may be bent toward the input terminal and thus the first connector may be coupled with the input terminal.

The other end of the FPCB may be bent toward the signal processing unit and thus the second connector may be coupled with the output terminal.

The both ends of the FPCB may further include an attachable and detachable grip which a user grips to mount or dismount the FPCB to or from the input terminal connected to the driving unit and the output terminal connected to the signal processing unit.

The attachable and detachable grip may be made of a material having density higher than that of the FPCB.

The LCD apparatus may further include a shield bracket which is formed on a lower end of the LCD module to cover the driving unit, and thus blocks electromagnetic waves possibly being emitted from the driving unit and is coupled to a stand which supports the LCD module.

The LCD apparatus may further include a power supply unit which is mounted on a rear surface of the LCD module, and supplies power to the LCD panel, the backlight unit, the signal processing unit, and the driving unit.

The second frame rate may be identical to the first frame rate.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
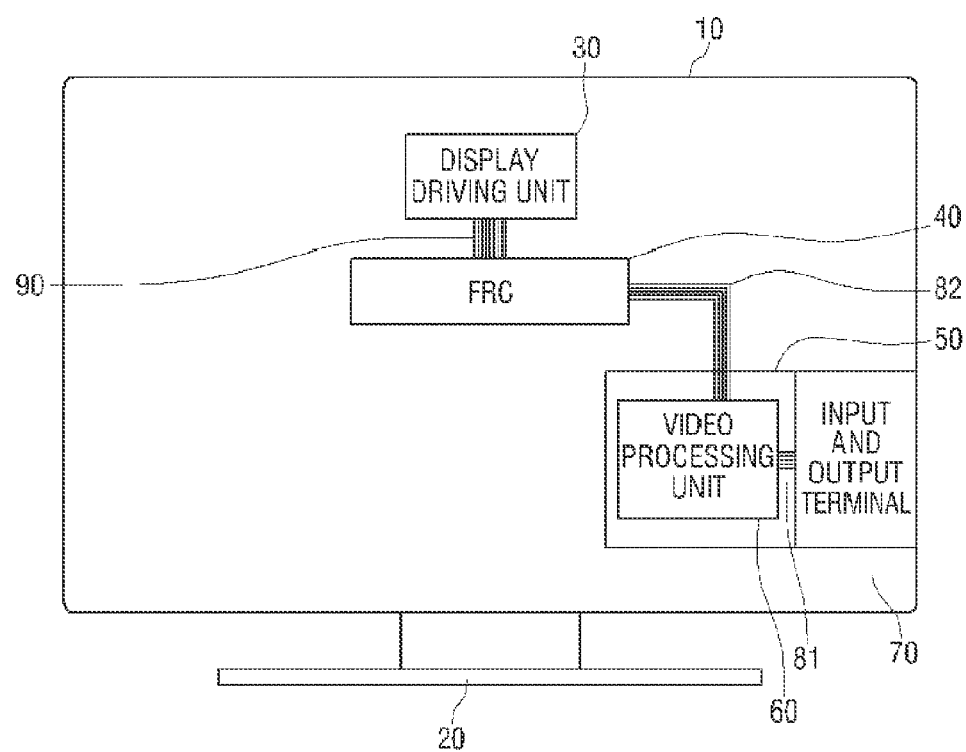
FIG. 1 is a view illustrating an arrangement of units provided in a related art digital television (DTV)
Figure 2:
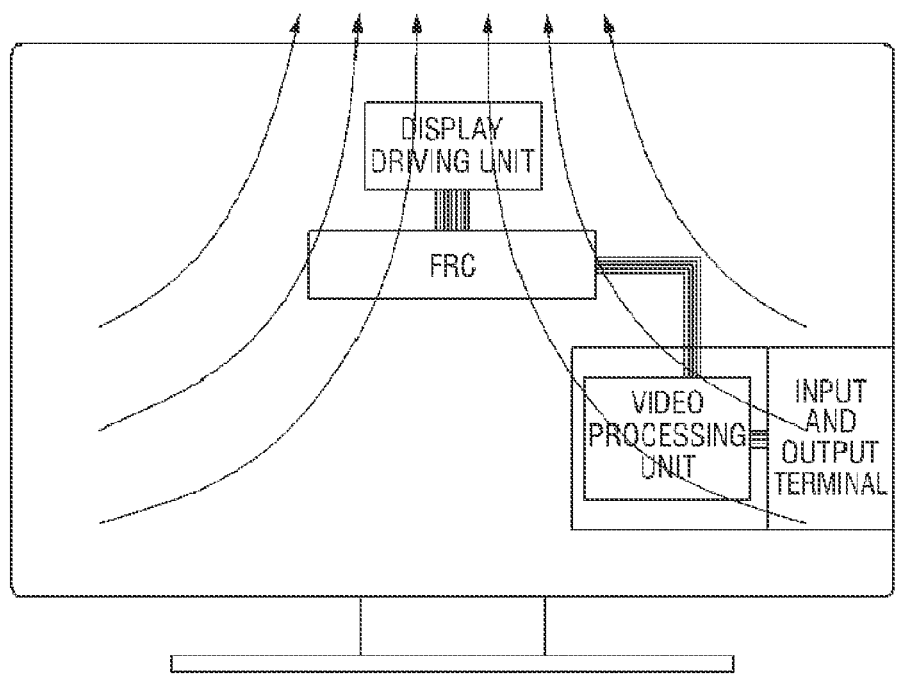
FIG. 2 is a view in which a display driving unit positioned on an upper part of DTV is exposed to heat which is generated from a lower side surface of the DTV and is radiated toward the upper center part.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 3:
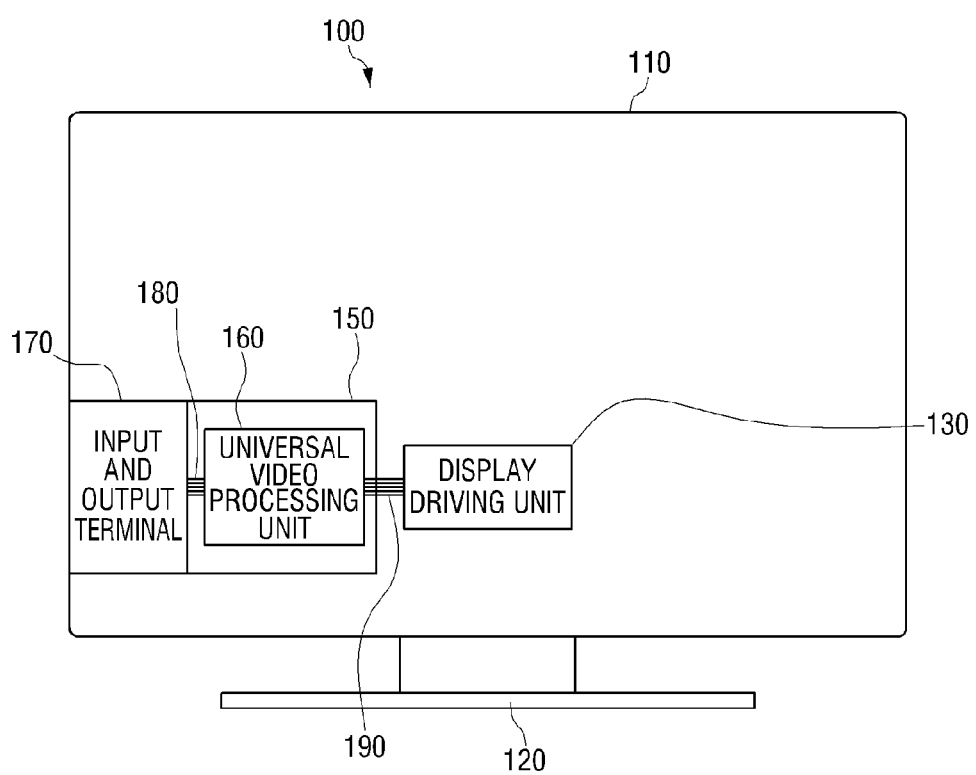
FIG. 3 is a view illustrating a DTV according to an exemplary embodiment of the present invention.

FIG. 3 is a view illustrating a DTV 100 according to an exemplary embodiment of the present invention. Referring to FIG. 3, the DTV 100 according to the exemplary embodiment of the present invention comprises a display 110, a stand 120, a display driving unit 130, and a video processing board 150. The video processing board 150 has a universal video processing unit 160 and an input and output terminal 170.

The display driving unit 130 drives the display 110 to display an input video.

The input and output terminal 170 is a group of terminals which receive or output a video signal from or to an external antenna, a cable, an external device, and so on (hereinbelow, referred to as the external device).

The universal video processing unit 160 processes a video signal received from the external device through the input and output terminal 170. The universal video processing unit 160 is connected to the input and output terminal 170 via the cable 180 to receive a video signal through the input and output terminal 170.

The cable 180 may be implemented in the video processing board 150 as a printed line, or may also be separately implemented from the video processing board 150.

The universal video processing unit 160 universally performs the signal processing. That is, the universal video processing unit 160 performs video decoding, video scaling, and also a frame rate conversion (FRC).

The universal video processing unit 160 may use a memory or another unit (not shown) when performing the signal processing.

The FRC is a kind of video processing which converts an input video into high-quality video by increasing a frame rate of the input video. For example, through the FRC process, a frame rate of a video may be increased from 60 Hz (60 frames per second) to 120 Hz (120 frames per second) or from 50 Hz (50 frames per second) to 100 Hz (100 frames per second).

The universal video processing unit 160 and the display driving unit 130 are connected through a dual cable 190.

The position of the display driving unit 130 may be the lower part on the DTV 100. In other words, the display driving unit 130 is disposed relatively on a lower part of the DTV 100 rather than an upper part.

The reason the video processing board 150 is located on the lower part of the DTV 100 is as follows.

First, the video processing board 150 is located on a lower part of the DTV 100 so that the input and output terminal 170 is disposed on a lower part of the DTV 100 and thus the DTV 100 can remain stable.

The external device is connected to the input and output terminal 170 through a cable. If the input and output terminal 170 is disposed on an upper part of the DTV 100, the DTV 100 becomes inclined or tilted when a cable is pulled by physical force. Accordingly, the input and output terminal 170 needs to be disposed on a lower part of the DTV 100 in order to prevent the DTV 100 from being inclined or tilted when a cable is pulled. To do so, the video processing board 150 having the input and output terminal 170 is disposed on a lower part of the DTV 100.

Second, the video processing board 150 is located on a lower part of the DTV 100 in order to shorten a distance between the universal video processing unit 160 and the display driving unit 130. Consequently, the length of the dual cable 190 connecting the universal video processing unit 160 and the display driving unit 130 may be minimized.

If the display driving unit 130 is located on an upper part of the DTV 100, the universal video processing unit 160 may need to be located on an upper part of the DTV 100 in order to minimize the distance between the universal video processing unit 160 and the display driving unit 130. However, since the display driving unit 130 is located on a lower part of the DTV 100, the video processing board 150 having the universal video processing unit 160 is located on a lower part of the DTV 100 to minimize the distance between the universal video processing unit 160 and the display driving unit 130.

Figure 4:
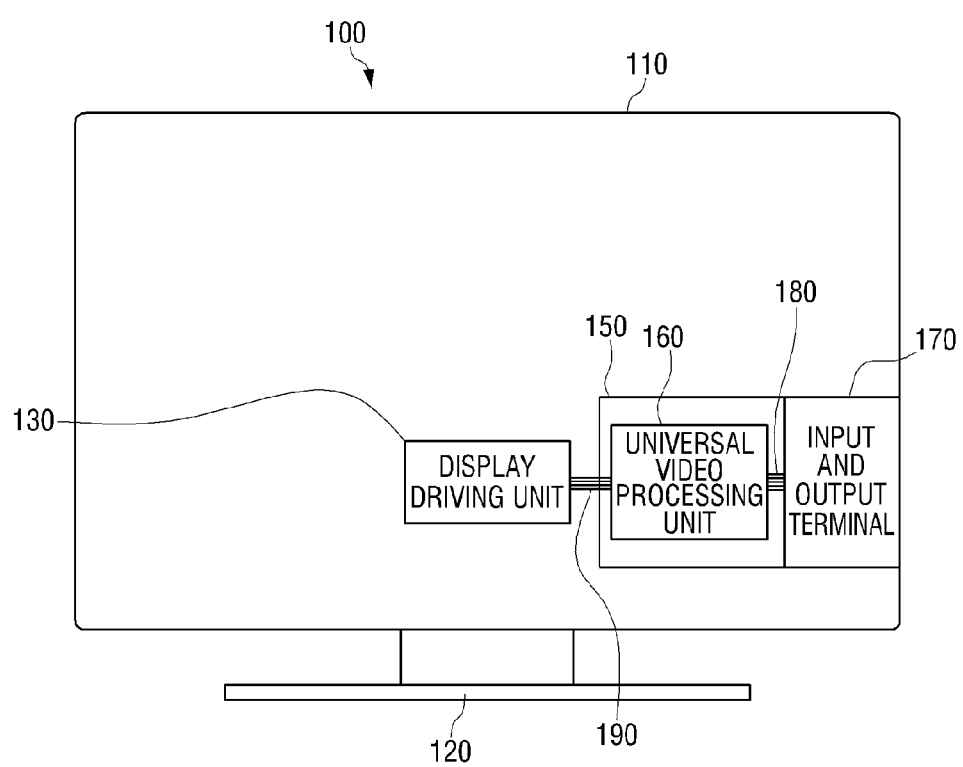
FIG. 4 is a view illustrating an alternative example of FIG. 3.

The display driving unit 130 is disposed on a lower center part of the DTV 100 and the video processing board 150 is disposed on an lower left part of the DTV 100, but this is merely exemplary. The display driving unit 130 and the video processing board 150 may be located on any lower portion of the DTV 100. Accordingly, the display driving unit 130 and the video processing board 150 may be moved to another location as long as they are located on a lower portion of the DTV 100. FIG. 4 is a view illustrating an alternative example of FIG. 3, in which the display driving unit 130 is disposed on a lower center part of the DTV 100, and the video processing board 150 is disposed on a lower right part of the DTV 100.

Figure 5A:
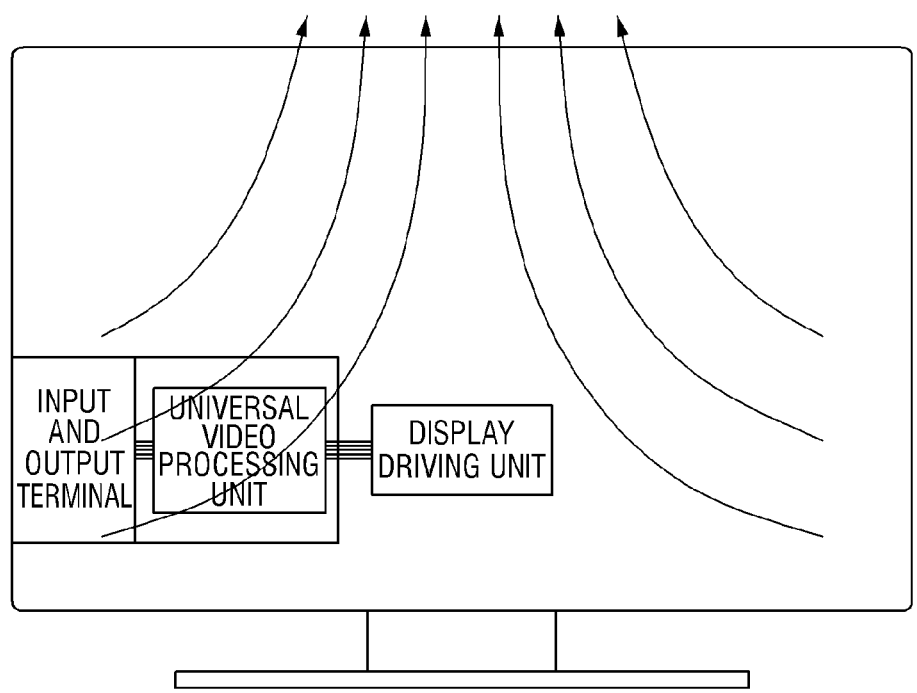
FIGS. 5A and 5B are views in which the display driving unit positioned on an upper part of the DTV of FIG. 2 is not exposed to heat which is generated from the side lower surface of the DTV and is radiated toward the upper center part.
Figure 5B:
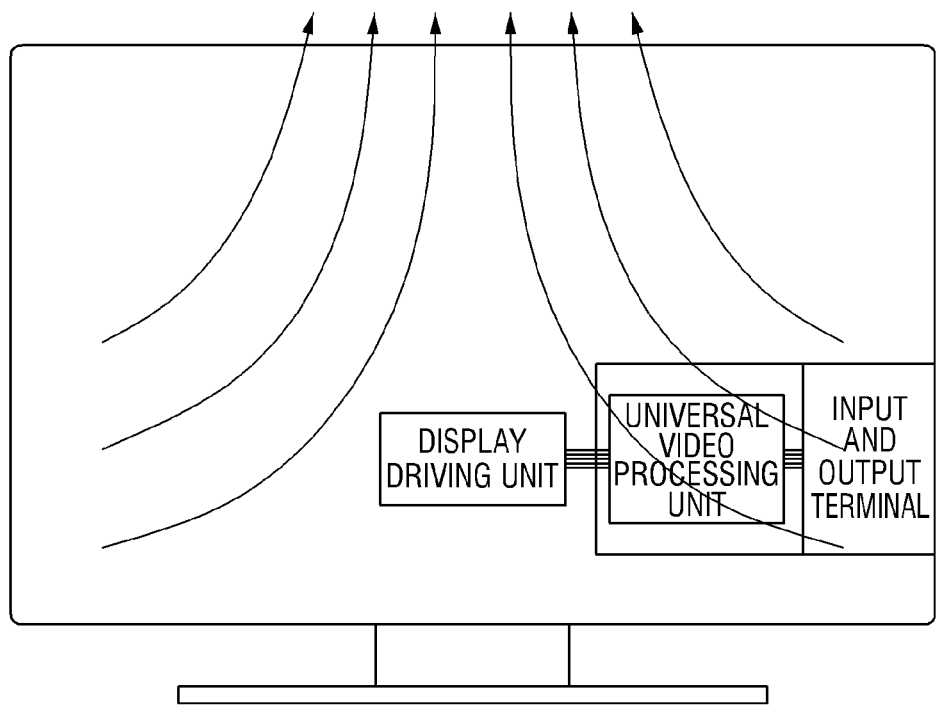

The display driving unit 130 is disposed on a lower center part of the DTV 100 as in FIGS. 3 and 4. Accordingly, the display driving unit 130 is less exposed to heat which is generated from a side lower surface of the DTV 100 and radiated toward an upper part, as illustrated in FIGS. 5A and 5B.

A location of the video processing board 150 on a lower part of the DTV 100 is merely a preferred exemplary embodiment of the present invention, and does not limit the scope of the present invention. Therefore, even if the video processing board 150 is disposed on other parts of the DTV 100, not on the lower part, the present invention may be applicable. That is, the exemplary embodiment of the present invention may be implemented without any limitation to the location of the video processing board 150.

Figure 6A:
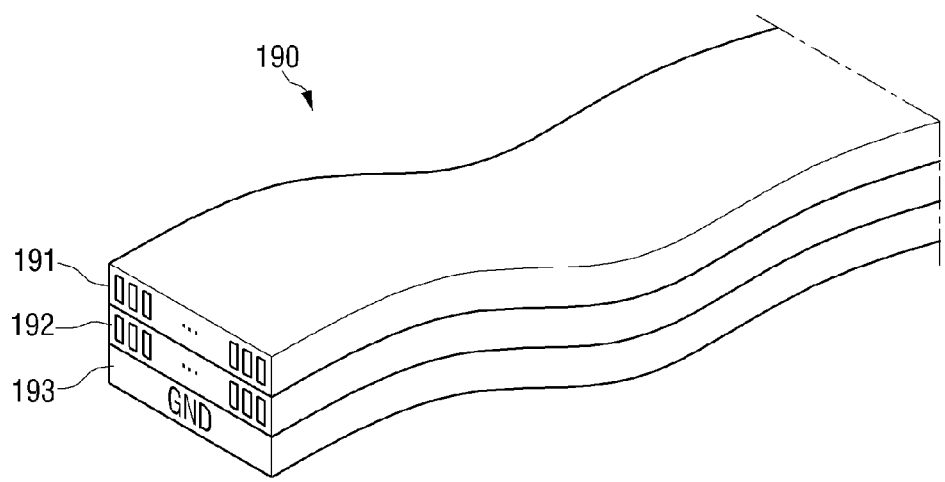
FIGS. 6A and 6B are views illustrating a dual cable according to an exemplary embodiment of the present invention.

FIG. 6A illustrates the dual cable 190 according to an exemplary embodiment of the present invention in detail. Referring to FIG. 6A, the dual cable 190 comprises a first layer 191, a second layer 192, and a ground (GND) 193.

The dual cable 190 transfers a video signal from the universal video processing unit 160 to the display driving unit 130.

If a frame rate of the video is increased twice, that is the video has a frame rate of 120 Hz or 100 Hz, since the universal video processing unit 160 also performs the FRC, the video signal is transferred through both the first layer 191 and the second layer 192.

However, If a frame rate of the video is not increased, that is the video has a frame rate of 60 Hz or 50 Hz, since the universal video processing unit 160 does not perform the FRC, the video signal is transferred through either the first layer 191 or the second layer 192.

Figure 6B:
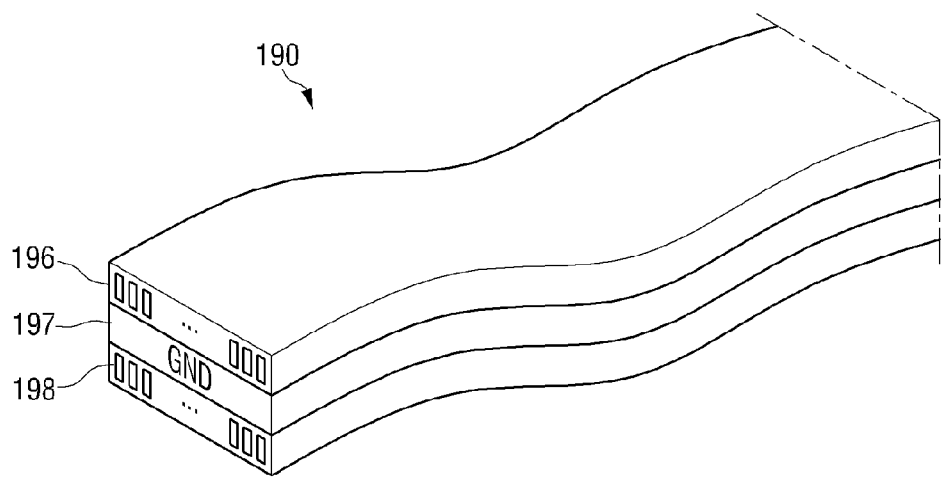

The dual cable 190 may be implemented as illustrated in FIG. 6B. The dual cable 190 of FIG. 6B differs from that of FIG. 6A, in that a ground (GND) 197 is disposed between a first layer 196 and a second layer 198.

Figure 7:
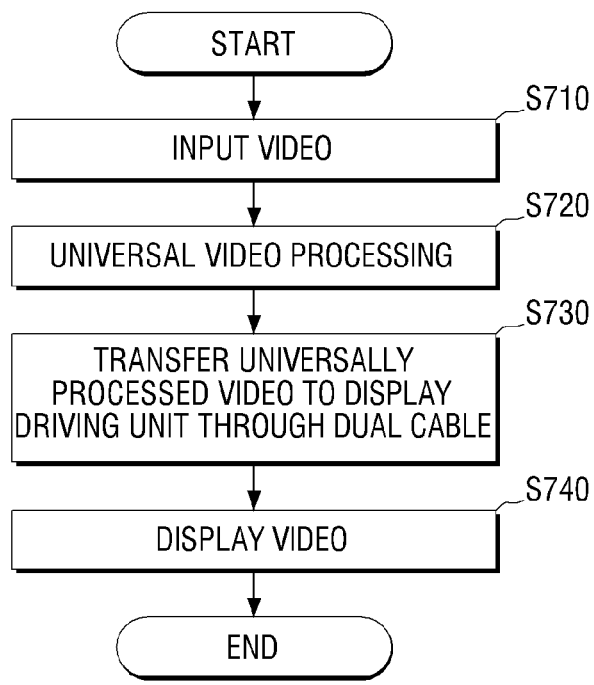
FIG. 7 is a flowchart provided to explain the process of receiving a video from a DTV, processing the received video, and displaying the processed video.

FIG. 7 is a flowchart provided to explain the process of receiving a video from the DTV 100, processing the received video, and displaying the processed video.

If a video signal is input from the external device to the input and output terminal 170 (S710), the universal video processing unit 160 performs universal video signal processing on the video signal received from the input and output terminal 170 (S720), as shown in FIG. 7. The universal video signal processing performs all or part of video decoding, video scaling, and FRC using a single unit or chip.

The video signal processed by the universal video processing unit 160 is transferred to the display driving unit 130 through the dual cable 190 (S730). Specifically, if the universal video processing unit 160 performs the FRC on a video, and thus a frame rate of the video is increased twice, that is the video has a frame rate of 120 Hz or 100 Hz, a signal of the video is transferred through two layers. However, if the universal video processing unit 160 does not perform the FRC on a video, and thus a frame rate of the video is not increased, that is the video has a frame rate of 60 Hz or 50 Hz, a signal of the video is transferred through a single layer.

The display driving unit 130 drives the display 110 to display a video corresponding to the video signal transferred through the dual cable 190 (S740).

To locate the display driving unit 130 on a lower part of the DTV 100, the display where the display driving unit is located on an upper part, and a video signal is input from the upper part may be rotated 180°. However, rotating the display may require the video processing board 150 to be moved from an upper part of the DTV 100 to a lower part of the DTV 100. In addition, the display driving unit 130 needs to drive the display 110 so that the video transferred from the universal video processing unit 160 is displayed on the display 110 in a 180° rotated state.

Alternatively, the display 110 may be implemented so that the video is rotated 180° and the rotated video is transferred to the display driving unit 130 when the universal video processing unit 160 performs the signal processing in operation S720. In this situation, the display driving unit 130 drives the display 110 to display the video provided by the universal video processing unit 160 as it is.

If the display driving unit 130 located on the lower part of the DTV 100 inputs a video signal from the lower part of the display 110, the video is rotated 180° and then input to the display 110. The rotation of the video is performed by the universal video processing unit 160 or the display driving unit 130.

Alternatively, if the display driving unit 130 located on the lower part of the DTV 100 inputs a video signal from the upper part of the display 110, the video is directly input to the display 110 without being rotated.

As described above, whether or not to rotate the video input to the display 110 180° may be determined according to the location where the display driving unit 130 inputs a video signal to the display 100, not according to the location of the display driving unit 130.

That is, when the display driving unit 130 inputs a video signal from the lower part of the display 110, it is required that a video is rotated 180° and then input to the display 110, but when the display driving unit 130 inputs a video signal from the upper part of the display 110, it is required that a video is input to the display 110 as it is, without being rotated.

The exemplary embodiments of the present invention are described, and the DTV explained in the exemplary embodiments of the present invention is merely an example of a liquid crystal display apparatus. Therefore, a technical idea of the present invention may be applied to liquid crystal display apparatuses other than the DTV according to the exemplary embodiments of the present invention.

The FRC described in the exemplary embodiments of the present invention is merely an example of signal processing which converts an input video into a high-quality or high-resolution video. Accordingly, although the universal video processing unit 160 uses another signal processing instead of the FRC to convert an input video into a high-quality or high-resolution video, a technical idea of the present invention may also be applied.

Hereinbelow, another exemplary embodiment of the present invention will be explained in detail with reference to FIG. 8.

Figure 8:
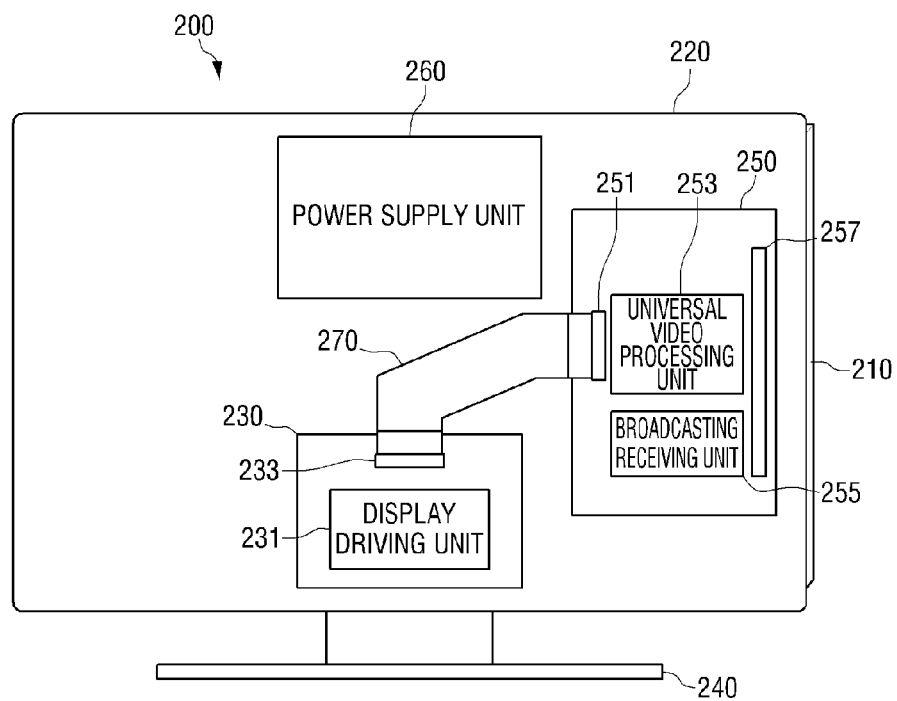
FIG. 8 is a view illustrating a DTV according to another exemplary embodiment of the present invention.

FIG. 8 is a view illustrating a DTV 200 according to another exemplary embodiment of the present invention. The DTV 200 according to the exemplary embodiment of the present invention comprises a liquid crystal display (LCD) module 210, a bottom chassis 220, a Timing Control (T-CON) board 230, a stand 240, a video processing board 250, a power supply unit 260, and a dual cable 270. Referring to FIG. 8, a Timing Control (T-CON) board 230 is disposed on an upper part of a bottom chassis 220 which is attached to a rear surface of a liquid crystal display (LCD) module 210 having a liquid crystal display (LCD) panel and a backlight unit. As shown in FIG. 8, the T-CON board 230 is disposed on the upper part of the bottom chassis 220. Since the bottom chassis 220 is attached to a rear surface of the LCD module 210, the T-CON board 230 appears to be disposed on an upper part of the LCD module 210. The T-CON board 230 comprises a display driving unit 231 and an input terminal 233.

The display driving unit 231 drives a liquid crystal display (LCD) panel to display a video which is input through the input terminal 233. Wires are formed on the T-CON board 230 so that the video being input through the input terminal 233 is transferred to the display driving unit 231.

Referring to FIG. 8, the position of the T-CON board 230 having the display driving unit 231 and the input terminal 233 is a lower part of the DTV 200.

In other words, the T-CON board 230 is located closer to the lower end than on the upper end of the DTV 200.

In FIG. 8, the video processing board 250 is disposed on a right part of the bottom chassis 220, and the power supply unit 260 is disposed on an upper center part of the bottom chassis 220.

The position of the video processing board 250 may be changed. For example, the video processing board 250 may be moved to a left part of the bottom chassis 220. In addition, the power supply unit 260 may be moved to a left part or a right part of the bottom chassis 220, on which the video processing board 250 is not disposed.

The power supply unit 260 supplies power to the display 210, the T-CON board 230, and the video processing board 250.

As shown in FIG. 8, the video processing unit 250 comprises an output terminal 251, a universal video processing unit 253, a broadcasting receiving unit 255, and an input terminal 257.

The broadcast receiving unit 255 tunes to a broadcasting signal which is selected by a user among broadcasting signals being input through an external antenna, a cable, an external device, and so on (hereinbelow, referred to as the external device).

The input terminal 257 receives or outputs a video signal from or to the external device. The input terminal 257 is disposed on a rear surface of the LCD module 210 near an edge area in the external direction of the LCD module 210.

The universal video processing unit 253 processes a video signal which is received from the external device through the broadcasting receiving unit 255 or the input terminal 257.

To enable a video signal to be transferred from the broadcasting receiving unit 255 or the input terminal 257 to the universal video processing unit 253, 1) a first wire which connects the broadcasting receiving unit 255 to the universal video processing unit 253 and 2) a second wire which connects the input terminal 257 to the universal video processing unit 253 are formed on the video processing board 250.

The universal video processing unit 253 universally performs the signal processing. That is, the universal video processing unit 253 performs video decoding, video scaling, and also a frame rate conversion (FRC). The universal video processing unit 253 may be implemented using a single chip. In addition, the universal video processing unit 253 may use a memory or another unit when performing the signal processing.

The FRC is a kind of video processing which converts an input video into high-quality video by increasing a frame rate of the input video. For example, through the FRC process, a frame rate of a video may be increased from 60 Hz (60 frames per second) to 120 Hz (120 frames per second) or 240 Hz (240 frames per second), or from 50 Hz (50 frames per second) to 100 Hz (100 frames per second) or 200 Hz (200 frames per second). That is, the FRC represents converting a frame rate of a video into 2N times (N=1, 2, 3 . . . ).

The universal video processing unit 253 outputs the processed video signal to the output terminal 251. Wires to transfer the video signal processed by the universal video processing unit 253 to the output terminal 251 are formed on the video processing board 250.

The output terminal 251 of the video processing board 250 is connected to an input terminal 423 of the T-CON board 230 through a dual cable 270. Accordingly, the video signal which is universally processed by the universal video processing unit 253 is transferred to the display driving unit 231.

The dual cable 270 which is illustrated in FIG. 6A or 6B may be used in this exemplary embodiment of the present invention. The dual cable 270 may be fabricated by laminating a flexible printed circuit board (FPCB). An example of the dual cable 270 which is fabricated using the FPCB is illustrated in FIGS. 9A and 9B.

Figure 9A:
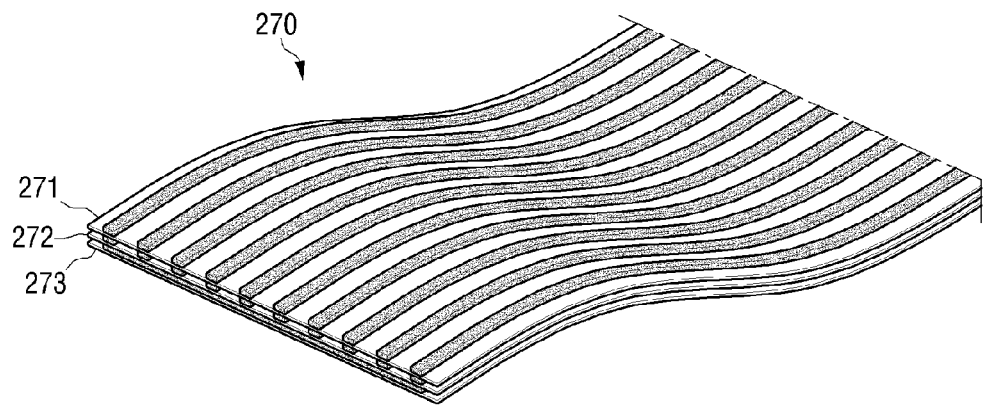
FIGS. 9A and 9B are views illustrating a dual cable according to another exemplary embodiment of the present invention.
Figure 9B:
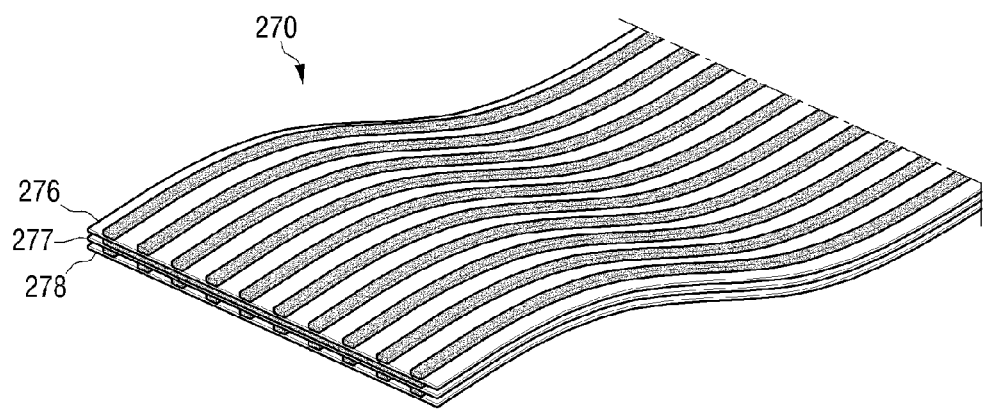

The dual cable 270 illustrated in FIG. 9A is fabricated by laminating a first layer 271, a second layer 272, and a ground (GND) 273.

The first layer 271 and the second layer 272 may be an FPCB on which a wire to transfer the universally processed video signal is printed, and the GND 273 may be an FPCB on which ground is printed.

If the universal video processing unit 253 performs the FRC on a video and thus a frame rate of the video is increased twice, that is, the video has a frame rate of 120 Hz or 100 Hz, a video signal may be transferred through both the first layer 271 and the second layer 272.

However, if the universal video processing unit 253 does not perform the FRC and thus a frame rate of a video is not increased, that is, the video has a frame rate of 60 Hz or 50 Hz, a video signal may be transferred through either the first layer 271 or the second layer 272.

The dual cable 270 may be fabricated as shown in FIG. 9B. The dual cable 270 illustrated in FIG. 9B is distinct from the dual cable 270 illustrated in FIG. 9A, in that, the GND 277 is located between the first layer 276 and the second layer 278.

The dual cables 270 illustrated in FIGS. 9A and 9B may be used when a frame rate of a video is increased twice by the FRC process. If a frame rate of a video is increased four times by the FRC process, that is, the video has a frame rate of 240 Hz or 200 Hz, it is preferred that two layers are further laminated.

In this situation, to laminate layers, the dual cable 270 illustrated in FIG. 9A may employ 1) a first method which laminates two layers on an upper part of the first layer 271, and the dual cable 270 illustrated in FIG. 9B may employ 2) a second method which laminates a layer on an upper part of the first layer 276 and on a lower part of the second layer 278, respectively.

Both ends of the dual cable 270 are bent as shown in FIG. 8. That is, when each end of the dual cable 270 is connected to the output terminal 251 of the video processing board 250 and the input terminal 423 of the T-CON board 230, an end is bent to enter the output terminal 251 of the video processing board 250, and opposite end is bent to enter the input terminal 423 of the T-CON board 230.

Figure 10:
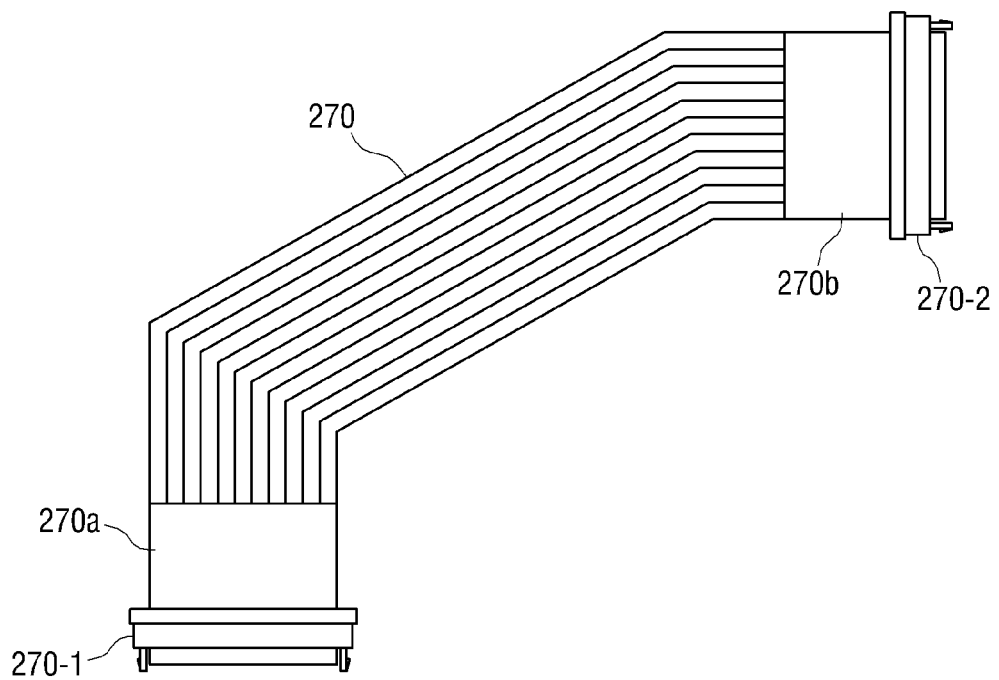
FIG. 10 is a view illustrating attachable and detachable grips mounted on a dual cable according to an exemplary embodiment of the present invention.

Attachable and detachable grips 270a and 270b may be mounted on the both ends of the dual cable 270 as shown in FIG. 10. Specifically, the attachable and detachable grips 270a and 270b are mounted on parts adjacent to connectors 270-1 and 270-2 of the dual cable 270.

The attachable and detachable grips 270a and 270b may be portions that a user grips to mount or dismount the connectors 270-1 and 270-2 of the dual cable 270 to or from the input terminal 423 of the T-CON board 230 and the output terminal 251 of the video processing board 250.

The attachable and detachable grips 270a and 270b may be implemented using a hard material having density higher than that of an FPCB, and attached to parts adjacent to the connectors 270-1 and 270-2 of the dual cable 270 in a specific size.

The attachable and detachable grips 270a and 270b are provided in order to resolve the problem that it is difficult to mount or dismount the connectors 270-1 and 270-2 to or from the output terminal 251 of the video processing board 250 and the input terminal 423 of the T-CON board 230 since an FPCB forming the dual cable 270 is too pliable and the size of connectors 270-1 and 270-2 is too small.

Figure 11A:
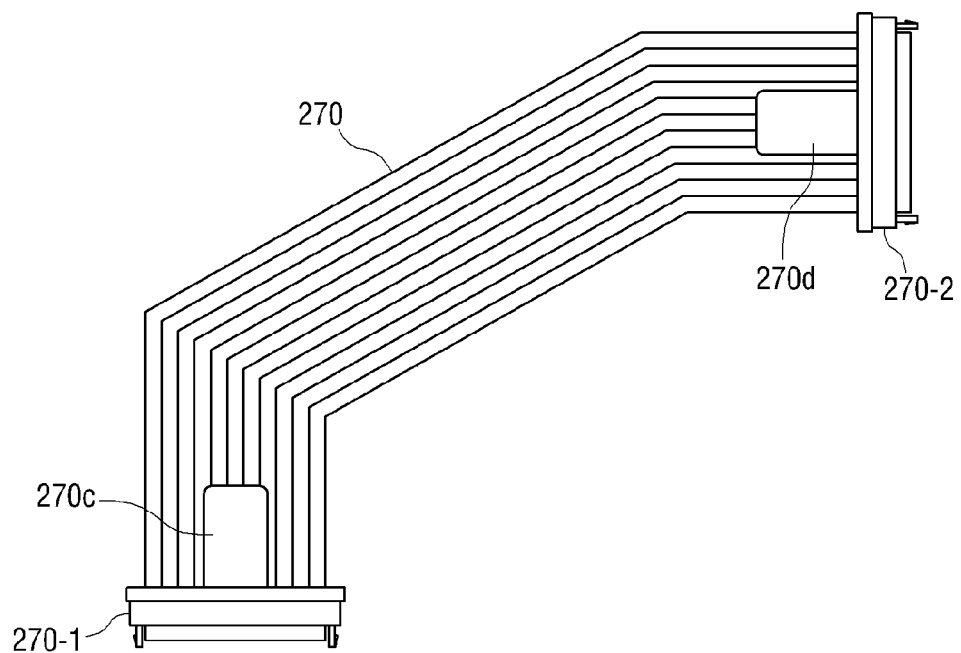
FIGS. 11A and 11B are views illustrating attachable and detachable grips mounted on a dual cable according to another exemplary embodiment of the present invention.

The dual cable 270 having attachable and detachable grips 270c and 270d different from the attachable and detachable grips 270a and 270b of FIG. 10 is illustrated in FIG. 11A.

The attachable and detachable grips 270c and 270d mounted on the dual cable 270 illustrated in FIG. 11A may be common with the attachable and detachable grips 270a and 270b mounted on the dual cable 270 illustrated in FIG. 10, in that the attachable and detachable grips 270c and 270d are also implemented using a hard material having density higher than that of an FPCB.

However, the attachable and detachable grips 270c and 270d illustrated in FIG. 11A are not attached to the dual cable 270, and an end is fixed to the dual cable by the connectors 270-1 and 270-2. Therefore, the attachable and detachable grips 270c and 270d illustrated in FIG. 11A are distinct from the attachable and detachable grips 270a and 270b illustrated in FIG. 10.

Figure 11B:
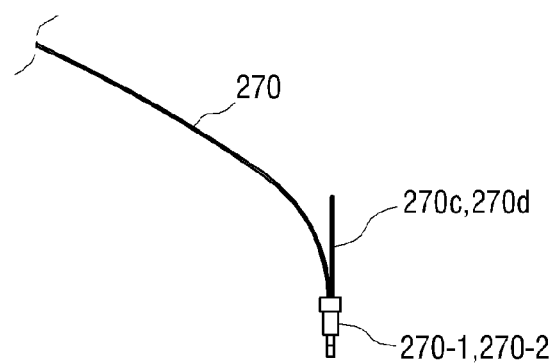

Accordingly, if the dual cable 270 is bent as shown in FIG. 11B, a space is formed between the attachable and detachable grips 270c and 270d and the dual cable 270. The space enables a user to easily mount or dismount the connectors 270-1 and 270-2 to or from the output terminal 251 of the video processing board 250 and the input terminal 423 of the T-CON board 230 while merely gripping the attachable and detachable grips 270c and 270d.

Figure 12:
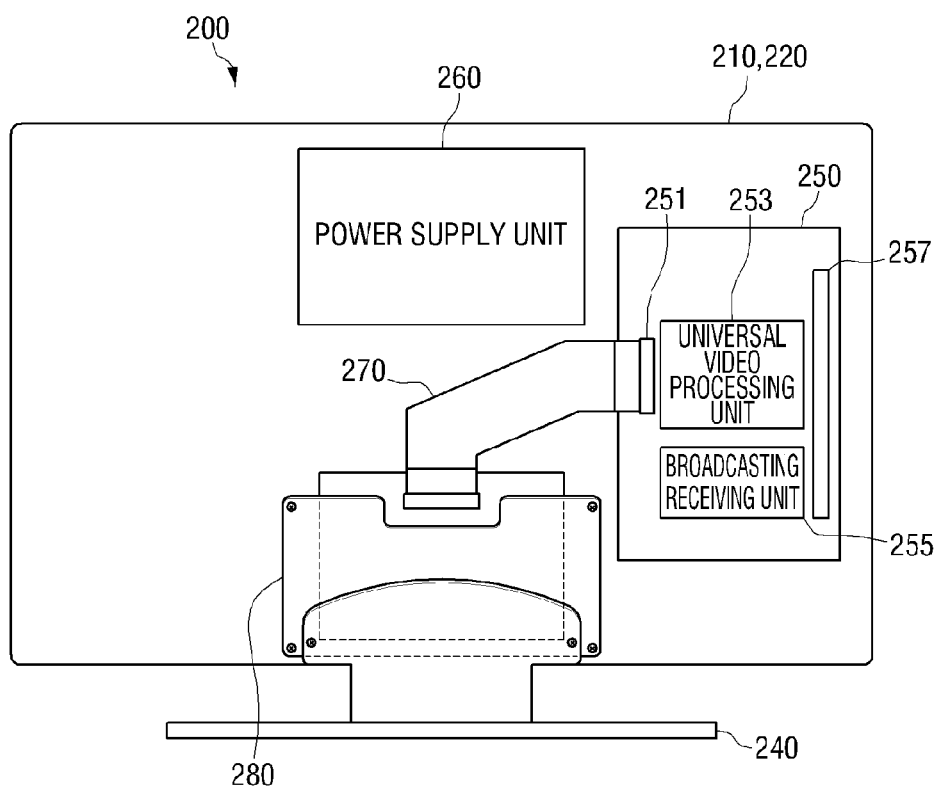
FIG. 12 is a view illustrating the structure that a display attached to the bottom chassis is placed on a stand through a shield bracket.

FIG. 12 is a view illustrating the structure that the LCD module 210 attached to the bottom chassis 220 is placed on the stand 240 through a shield bracket. Referring to FIG. 12, the bottom chassis 220 having the LCD module 210 is fixed on the stand 240 through a shield bracket 280.

The shield bracket 280 illustrated in FIG. 12 is disposed on a rear surface of the T-CON board 230, and configured to cover the display driving unit 231 provided on the T-CON board 230. Accordingly, the shield bracket 280 may block electromagnetic waves possibly being emitted from the T-CON board 230.

The DTV 200 according to another exemplary embodiment of the present invention has been described. The process that the DTV 200 receives, processes, and displays a video may be readily understood from the flowchart illustrated in FIG. 7, and thus detailed descriptions thereof will be omitted.

Other cables may be used for the dual cable 270 described in this exemplary embodiment of the present invention. However, if a general cable is used, two or four cables are required according to a frame rate which is converted by an FRC process.

As described above, according to exemplary embodiments of the present invention, a display driving unit is disposed on a lower part of a display apparatus, and thus the display driving unit is prevented from being exposed to heat. When a display driving unit is fixed on a display, the display driving unit may be moved to a lower part of a display apparatus without changing the design of the display.

In addition, the length of a cable may be reduced, and also a single kind of cables may be universally used for video signals having various frame rates such as 60 Hz and 120 Hz.

As the units for processing video signals can be combined, the number of required memories may be reduced, and the fabrication cost and the required volume of the whole units may also be reduced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
    a display module;
    an input terminal which is mounted on a rear surface of the display module, and receives a video signal having a first frame rate from an external source;
    a signal processing unit which is mounted on the rear surface of the display module, and processes the received video signal and outputs a video signal having a second frame rate;
    a driving unit which drives the display module so that the output video signal is displayed on the display module at the second frame rate; and
    a shield bracket which partially covers a printed circuit board of the driving unit,
    wherein the second frame rate is higher than the first frame rate,
    wherein the second frame rate is 2N times (N=1, 2, 3 . . . ) of the first frame rate,
    wherein the driving unit is disposed on a part near a lower end of a rear surface of the display module, and
    wherein the shield bracket partially covers the printed circuit board of the driving unit such that a cable transferring the video signal connected between the driving unit and the signal processing unit is attachable or detachable from the printed circuit board without removing the shield bracket.

2. The display apparatus of claim 1, wherein the driving unit is disposed at a location on the rear surface of the display module, the location being closer to the lower end of the rear surface of the display module than an upper end of the rear surface of the display module.

3. The display apparatus as claimed in claim 1, wherein
    the shield bracket is fixed to the display module and covers the driving unit, and thus blocks electromagnetic waves being emitted from the driving unit, and is coupled to a stand which supports the display module,
    wherein the display module is fixed on the stand through the shield bracket, and
    wherein the driving unit is located on a lower center part nearer a lower end of a rear surface of the display module than an upper end of the rear surface of the display module.

4. The display apparatus as claimed in claim 1, wherein the input terminal and the signal processing unit are mounted on a single board, wherein the input terminal is mounted on a rear surface of the display module adjacent to an edge area in an external direction of the display module.

5. The display apparatus as claimed in claim 1, wherein the signal processing unit converts the video signal and outputs the converted video signal to the driving unit so that the video signal is displayed on the display module rotated 180 degrees.

6. The display apparatus as claimed in claim 1, wherein the driving unit drives the display module so that the video signal output from the signal processing unit displayed on the display module is rotated 180 degrees.

7. The display apparatus as claimed in claim 1, further comprising:
   the cable which connects the signal processing unit and the driving unit;
   an output terminal which is mounted on a part of the signal processing unit; and
   wherein the input terminal is mounted on a part of the driving unit,
   wherein the cable is a flexible printed circuit board (FPCB), on which a wire capable of transferring the video signal is printed, and which comprises a first end and a second end to mount a first connector and a second connector coupled with the output terminal and the input terminal.

8. The display apparatus as claimed in claim 7, wherein the video signal output from the signal processing unit is transferred to the driving unit through the cable.

9. The display module apparatus as claimed in claim 7, wherein the shield bracket partially covers the printed circuit board of the driving unit such that the cable is uncovered by the shield bracket.

10. The display apparatus as claimed in claim 7, wherein the FPCB comprises a first layer and a second layer which transfer the video signal,
    wherein the first end of the FPCB is bent toward the driving unit and thus the first connector is coupled with the input terminal and the second end of the FPCB is bent toward the signal processing unit and thus the second connector is coupled with the output terminal.

11. The display apparatus as claimed in claim 7, wherein the first end and the second end of the FPCB further comprise an attachable and detachable grip which a user grips to mount or dismount the FPCB to or from the input terminal connected to the driving unit and the output terminal connected to the signal processing unit,
    wherein the attachable and detachable grip is preferably made of a material having intensity higher than that of the FPCB.

\* \* \* \* \*